United States Patent
Grover

(10) Patent No.: US 12,271,495 B2
(45) Date of Patent: Apr. 8, 2025

(54) MANAGEMENT OF RESOURCE ACCESS IN A BLOCKCHAIN

(71) Applicant: MICRO FOCUS LLC, Santa Clara, CA (US)

(72) Inventor: Douglas Max Grover, Provo, UT (US)

(73) Assignee: Micro Focus LLC, Santa Clara, CA (US)

( * ) Notice: Subject to any disclaimer, the term of this patent is extended or adjusted under 35 U.S.C. 154(b) by 338 days.

(21) Appl. No.: 17/459,417

(22) Filed: Aug. 27, 2021

(65) Prior Publication Data

US 2023/0063043 A1 Mar. 2, 2023

(51) Int. Cl.
G06N 20/00 (2019.01)
G06F 21/62 (2013.01)

(52) U.S. Cl.
CPC ......... *G06F 21/6218* (2013.01); *G06N 20/00* (2019.01); *G06F 2221/2113* (2013.01); *G06F 2221/2141* (2013.01)

(58) Field of Classification Search
CPC ......... G06F 21/6218; G06F 2221/2141; G06F 21/64; G06N 20/00; H04L 9/50; H04L 63/083; H04L 63/10
See application file for complete search history.

(56) References Cited

U.S. PATENT DOCUMENTS

| | | | |
|---|---|---|---|
| 7,877,791 B2 * | 1/2011 | Childress | H04L 63/083 713/168 |
| 10,468,165 B2 | 11/2019 | Masaaki et al. | |
| 10,541,806 B2 | 1/2020 | Rosenoer | |
| 10,812,477 B2 | 10/2020 | Zou | |
| 10,862,901 B2 | 12/2020 | Ford et al. | |
| 10,972,475 B1 | 4/2021 | Zaki et al. | |
| 2020/0120084 A1 | 4/2020 | Cheng et al. | |
| 2020/0202343 A1 | 6/2020 | Shi et al. | |
| 2020/0304289 A1 * | 9/2020 | Androulaki | H04L 9/0637 |
| 2020/0371832 A1 | 11/2020 | Baset et al. | |
| 2021/0182996 A1 * | 6/2021 | Cella | G06Q 10/083 |
| 2022/0138344 A1 * | 5/2022 | Krishnan | G06F 16/2471 726/26 |

FOREIGN PATENT DOCUMENTS

| CN | 112328558 A | 2/2021 |
|---|---|---|
| WO | WO-2021040773 A1 | 3/2021 |

OTHER PUBLICATIONS

Khan, et al; Cloud Log Forensics: Foundations, State-of-the-Art, and Future Directions; Cloud Log Forensics; Foundations, State-of-the-Art, and Future Directions; ACM Computing Surveys, vol. 0, No. 0, Article 0, Publication date: 2016; 44 pages.

* cited by examiner

Primary Examiner — Shin-Hon (Eric) Chen
Assistant Examiner — Ladimir I Gavrilenko
(74) Attorney, Agent, or Firm — Sheridan Ross P.C.

(57) ABSTRACT

A plurality of different types of resource access events are identified. For example, a resource access event may be an administration event where a user is given certain access rights to view/modify a resource, such as, a database record. A plurality of blocks are generated, where each block is associated with an individual one of the plurality of different types of resource access events. The plurality of blocks are added to a first resource access blockchain. The blockchain can be used to track the various types of resource access events.

20 Claims, 5 Drawing Sheets

MANAGEMENT OF RESOURCE ACCESS IN A BLOCKCHAIN

FIELD

The disclosure relates generally to blockchains and particularly to management of data access using a blockchain.

BACKGROUND

Access to security information in a blockchain is typically not tracked in the blockchain. For example, while there are solutions that grant different access levels, there is currently not a complete solution that tracks the administration of access/login process/access of records in a single blockchain.

In addition, the existing solutions typically use a traditional blockchain structure where there is a single blockchain. Traditional blockchains are very inefficient for quickly identifying access, tracking/transactions, and anomaly detection because traditional blockchains are not designed for tracking mixed block types/anomaly detection. As a result, the traditional blockchain structure becomes very inefficient when a blockchain become long.

SUMMARY

These and other needs are addressed by the various embodiments and configurations of the present disclosure. A plurality of different types of resource access events are identified. For example, a resource access event may be an administration event where a user is given certain access rights to view/modify a resource, such as, a database record. A plurality of blocks are generated, where each block is associated with an individual one of the plurality of different types of resource access events. The plurality of blocks are added to a first resource access blockchain. The blockchain can be used to track the various types of resource access events.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112 Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
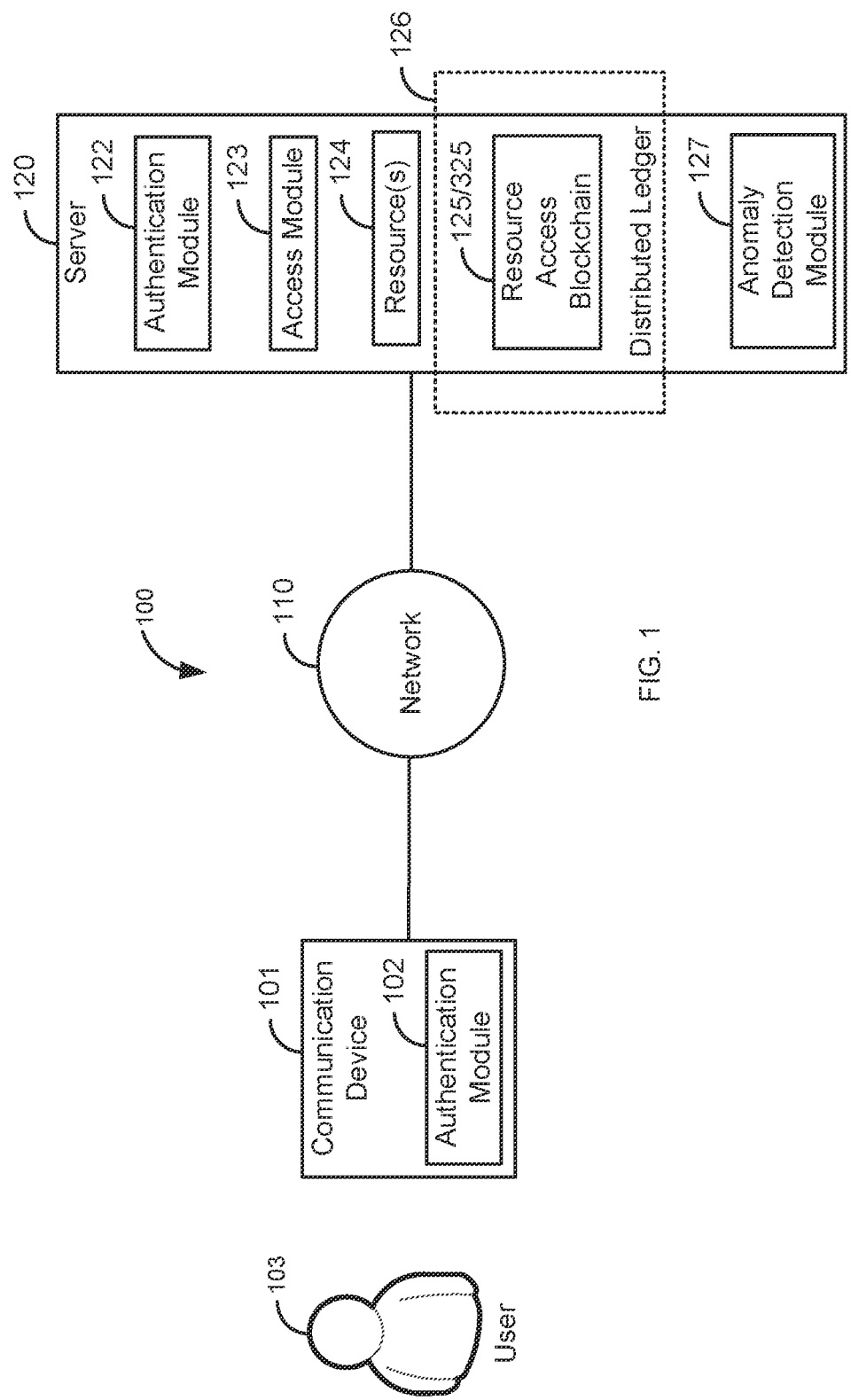
FIG. 1 is a block diagram of a first illustrative system for management of resource access in a resource access blockchain.

FIG. 1 is a block diagram of a first illustrative system 100 for management of resource access in a resource access blockchain 124. The first illustrative system 100 comprises a communication device 101, a network 110, and a server 120. FIG. 1 also shows a user 103 for convenience.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, and the like. Although not shown in FIG. 1, any number of communication devices 101 may be connected to the network 110.

The communication device 101 further comprises an authentication module 102. The authentication module 102 works in conjunction with the authentication module 122/access module 123 on the server 120 to grant access by the user 103 to the resource(s) 124. For example, the authentication module 102 may provide a username/password to the server 120 for authenticating the user 103. In one embodiment, the communication device 101 may not have the authentication module 102 (e.g., where authentication is provided via a web server using the authentication module 122).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any hardware/software that can provide authentication services and resource(s) 124 to the user 103, such as, a web server, an authentication server, a firewall, an application server, a proxy server, an embedded device, a router, and/or the like. The server 120 further comprises an authentication module 122, an access module 123, resource(s) 124, a resource access blockchain 125/325, and an anomaly detection module 127.

The authentication module 122 can be or may include any hardware/software that can provide access services to the user 103 via the authentication module 102. The authentication module 122 may be used to authenticate a plurality of different users 103 on a plurality of communication devices 101.

The access module 123 comprises one or more rules that can be defined or administered for granting access to the resource(s) 124. The rules may define various types of access, such as, read access, write access, access to specific records based on an authentication level, access to a device, access to a network 110, access to a database, access to an application, access to a service, access to a cloud, and/or the like.

The resource(s) 124 may comprise any type of resource that can be accessed via an electronic means, such as, computer records, computer data, a database, a table in a database, an individual record, a record in a database table, a device, a network 110, an operating system, a virtual machine, a container, a printer, a scanner, a FAX machine, a server 120, a Personal Computer (PC), a notebook device, a laptop computer, and/or the like. The resource(s) 124 may also comprise a physical resource that is accessed through an electronic means (e.g., using electronic lock), such as a building, a room, a location, and/or the like. The resource(s) 124, although shown on the server 120 may reside external to the server 120. For example, the resource 124 may a distributed database on the network 110 or a device on the network 110, such as a printer.

The resource access blockchain 125/325 comprises a blockchain that is specific to resource management. The resource access blockchain 125/325 may be part of a distributed ledger 126. The distributed ledger 126 is where the resource access blockchain 125/325 is copied to other locations on the network 110. The distributed ledger 126 is a standard method that is used to make changes to the resource access blockchain 125/325 immutable.

The anomaly detection module 127 can be or may include any hardware/software that can detect anomalies in the resource access blockchains 125/325. Anomaly detection may be used to identify where a user's credentials have been compromised, where a network has been compromised, where a resource 124 has been compromised, and/or the like. The anomaly detection module 127 may use various types of machine learning, such as, supervised machine learning, semi-supervised machine learning, unsupervised machine learning, and/or the like to identify anomalies.

Figure 2:
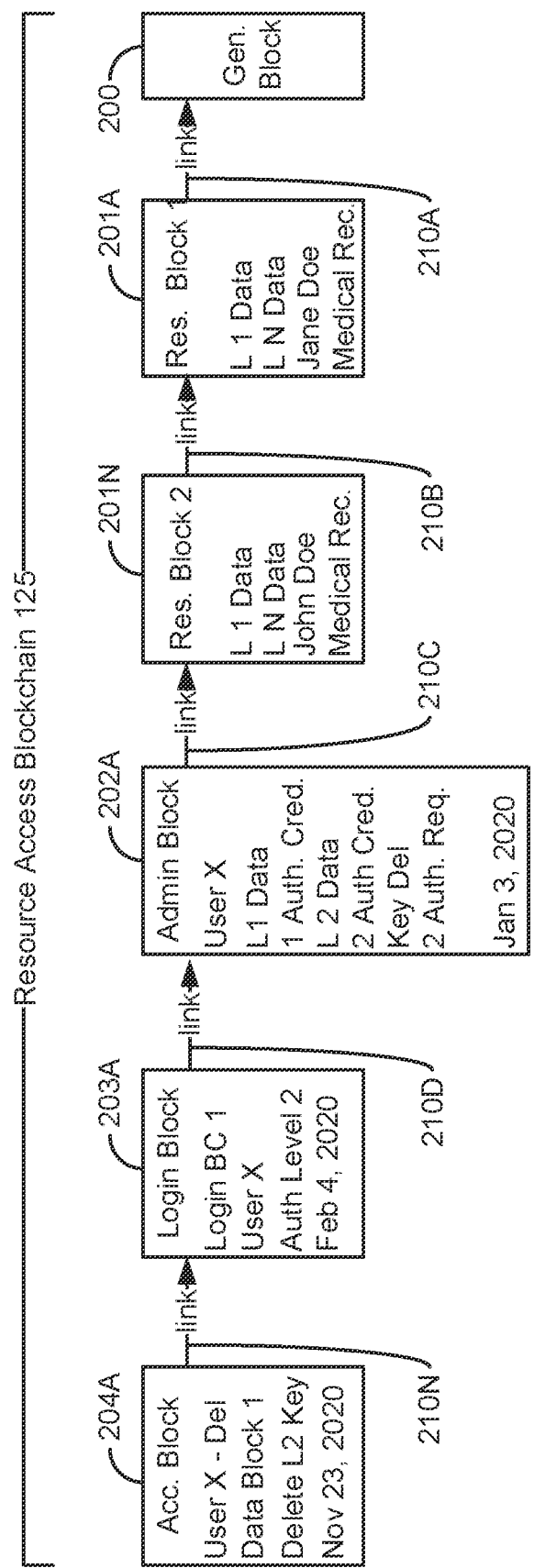
FIG. 2 is a block diagram of an exemplary resource access blockchain.

FIG. 2 is a block diagram of an exemplary resource access blockchain 125. The resource access blockchain 125 comprises a genesis block 200, resource blocks 201A-201N, an administration block 202A, a login block 203A, and user access block 204A.

The genesis block 200 is block that is created when the resource access blockchain 125 is first created. When the genesis block 200 is created, the genesis block may contain information associated with the resource(s) 124 that are being tracked in the resource access blockchain 125. For example, the genesis block 200 may have information about the server 120 or a virtual machine on the server 120 that is being tracked in the resource access blockchain 125. This allows the access module 123 to be able to identify the appropriate resource access blockchain 125 if there are different resources 124 being tacked in different resource access blockchains 125/325.

Figure 3:
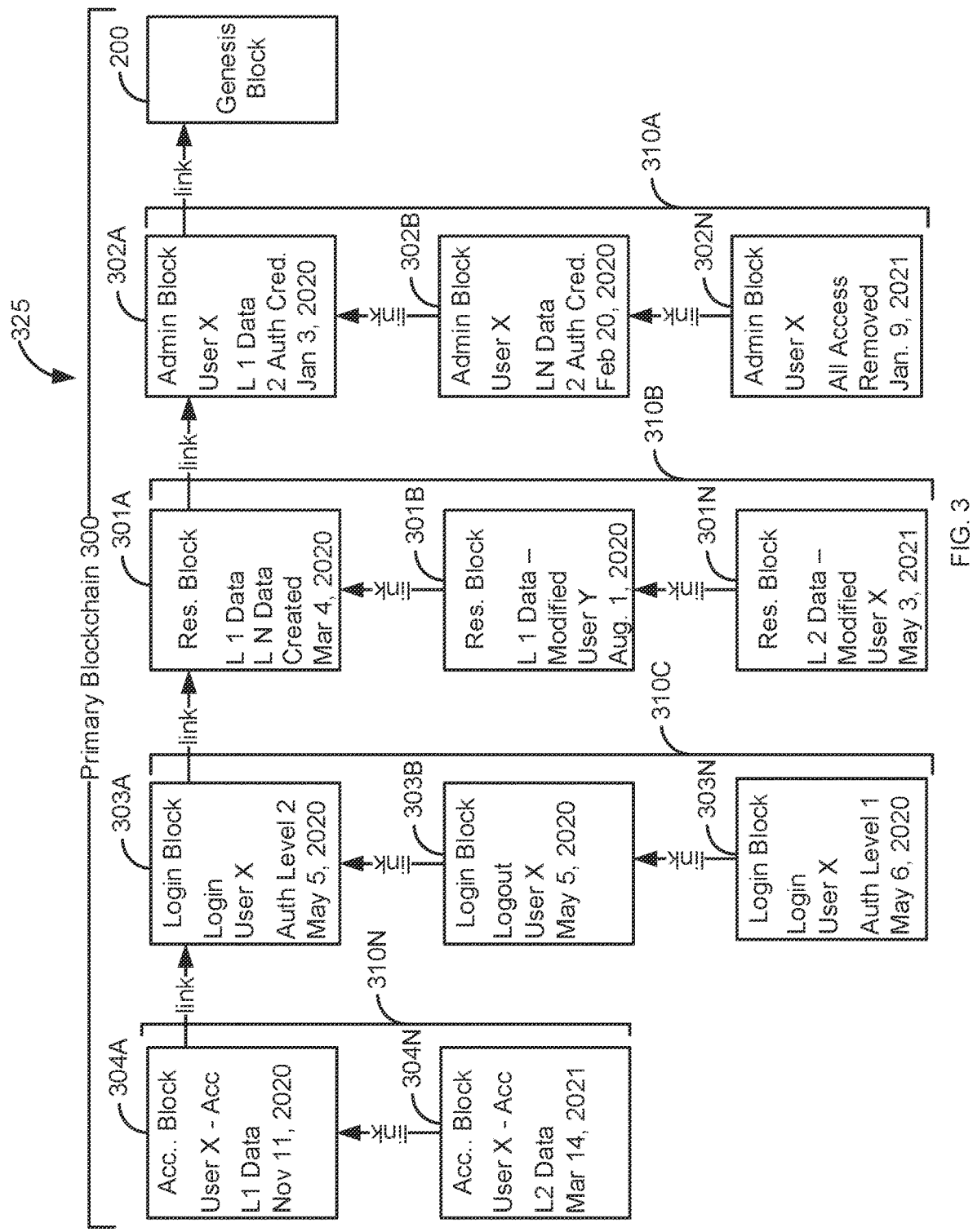
FIG. 3 is a block diagram of an exemplary resource access blockchain that has branches for different types of resource events.

The resource blocks 201A-201N are blocks that are created when the resource 124 is first created or when the resource access blockchain 125 is first administered. In FIG. 3, the resource block 201A is for a medical record for Jane Doe. The resource block 201A comprise level 1 data and level 2 data. For example, level 1 data may comprise Jane Doe's name/address and level 2 data may be Jane Doe's social security number/credit card information. Here, level 1 data is less sensitive information and the level 2 data is more sensitive information. The level 1/level 2 data may be encrypted. In addition, the level 2 data may use stronger encryption. For example, level 1 data may be encrypted using Data Encryption Standard (DES) 128 and the level 2 data may be encrypted using DES 256.

The resource blocks 201A-201N may also include information about if the encrypted data has an administered delete-able encryption key (a forget me encryption key). The forget me encryption key is an encryption key that can be deleted so that access to the information associated the encryption key cannot be accessed later on.

The resource block 201N is for a medical record for the John Doe. The resource block 201N is similar to the resource block 201A. In one embodiment the resource blocks 201A-201N may actually contain the information. Alternatively, the resource blocks 201A-201N may only point to the data (e.g., the data is stored in a record in a database). The resource blocks 201A-201N may comprise other information, such as, if the record was modified, if the record was deleted, who added the record, who modified the record, who deleted the record, a date/time when the record was added, modified, or deleted, and/or the like.

The types of information that may be tracked in the resource blocks 201 may vary based on implementation For example, the resource(s) 124 may include information, such as, medical records, employee records, Internet of Things (IoT) records, information management records, network information, user purchase history information, collaboration information, firewall activity, financial records, device management records, anti-virus/malware information, and/or the like The administration block 202A is created when a user 103 is given access to the resource(s) 124. The administration block 202A shows that user X was given access to level 1 data, level 2 data, and the ability to delete a forget me encryption key. The administration block 202A shows that user X 103 must get approval from a second administrator in order to delete the forget me encryption key. A forget me encryption key is where data (e.g., the level 2 data) is encrypted and the forget me encryption key is deleted. Thus access to the level 2 data can no longer occur. The administration block 202A also has the date of the administration (Jan. 3, 2020). The date may also include time information.

The login block 203A is created when the user X 103 (or any other administered user 103) logins in. The login block 203A also identifies the level of access that the user logged in with. For example, the user 103 may login using level one access. Thus, even though the user X 103 is administered for both level 1 and level 2 access, the user 103 can only access level one data (e.g., Jane Doe's name and address). The authentication level may be based on authentication credentials. For example, for level 1 access the user 103 can use a username/password. For level 2 access the user 103 may need to provide a second credential (e.g., a fingerprint or rental scan). The access levels may be based on other criteria. For example, if the user 103 is local, L2 access is granted. If the user is remote, only L1 access may be granted regardless of how many levels of authentication are provided.

The login block 203 may also include logout information. For example, when the user X 103 logs out, a new login block 203 is created that indicates when the user X 103 logged out. In addition, the login block 203 may include invalid logins. For example, if the user 103 entered an invalid password or username. The login block 203 may also include information about the invalid login. For example, the login block 203 may include information about how close the password was to the actual password, the actual invalid password (if it is completely different from the actual password), and/or the like.

The access block 204A is created when the user accesses a resource 124. For example, the access block 204 may indicate when the user 103 views the medial record of Jane Doe. The access block 204A is where the user X 103 has deleted the forget me encryption key. The access block 204 may include access to a hardware resource 124. For example, the access block 204 may indicate access to a printer, an electronic door lock (access to a room), access to a thumb drive, access to a scanner, access to a WiFi card, and/or the like.

Although not shown, other types of blocks may be included in the resource access blockchain 125. For example, if a software application (a resource 124) is tracked by the resource access blockchain 125, an execution block (not shown) may be added to the resource access blockchain 125 that indicates that software application has been executed by a specific user or application. The execution block may include information, such as, time, date, who/what executed the application, and/or the like. An execution block may be created when a container or virtual machine is executed.

Another type of block may be a configuration block. For example, a software application (or an operating system, a container, a virtual machine, etc.) may have configuration data. Changes to the configuration data for the application may be stored in a configuration block in the resource access blockchain 125. For example, the initial licensing or change of the number of licenses of an application could be stored in a configuration block in the resource access blockchain 125. Other types of configuration information may include specific features that can be used, selected display colors, types of authentication credentials needed, remote or local access, password strength requirements, and/or the like.

In one embodiment, access may be granted at a global level (for multiple resource access blockchains 125/325). In this example, individual administration bocks 202 would be added to each of the resource access blockchains 125/325 where global access was granted (a single event). For example, if user X 103 was granted global access for resource access blockchains 125A and 125B, an administration block 202 would be added to both of the resource access blockchains 125A and 125B for user X 103.

When user X 103 accesses information in a block, an access block 204 is created. For example, if user X 103 logs in and then accesses John Doe's record, a login block 203 and then an access block 204 are created. An access block 204 could be created for access to each record stored in a database (a resource 124). Alternatively, a single access block 204 could track access to multiple records (e.g., access to both Jane Doe's and John Doe's records). In this example, there may be only a single access block 204, but the access block 204 would have information on what records (resources 124) were accessed.

Access blocks 204 may also include deletion of a forget me encryption key. In FIG. 2, the access block 204A is for deleting a forget me key for level 2 data (e.g., the level 2 data in Jane Doe's and John Doe's medical records). The forget me encryption key may be across records (resources 124) or for a specific record (resource 124). The delete forget me key block may have its own type of block (e.g., a forget me key removal block) that has a separate branch 310 as described below in FIG. 3. In one embodiment, deletion of the forget me key may be tied to the data record in a branch 310 as described in FIG. 3. Likewise, administration of adding an forget me encryption key may be added as part of a branch 310.

FIG. 3 is a block diagram of an exemplary resource access blockchain 325 that has branches 310A-310N for different types of data access events. One problem with traditional blockchains is that the blockchain structure is inefficient for tracking different types of information. Typical blockchains are good for tracking the same kinds of information. For example, Bitcoin works great for tracking a single type of information—Bitcoins. Traditional blockchains (e.g., the resource access blockchain 125) may contain multiple types of records, such as, resource blocks 201, an administration blocks 202, login blocks 203, access blocks 204, execution blocks, configuration blocks, etc. If all this information is stored in a traditional blockchain structure, it makes identifying the same types blocks more difficult because the blocks are interspersed throughout the resource access blockchain 125. This is especially true when the resource access blockchain 125 becomes long.

FIG. 3 illustrates a different type of blockchain resource access blockchain 325 where the structure is more conducive for tracking of the different types of blocks in the resource access blockchain 325. The structure of the resource access blockchain 325 is more efficient because similar type blocks are grouped together in branches 310A-310N in the resource access blockchain 325. In addition, hash validation is dramatically improved over traditional blockchains. For example, to validate a hash, the hash would be made on each branch 310 back to the genesis block 200 instead of doing a hash over all the blocks like would be done for the resource access blockchain 125. Thus, not only is this structure more efficient, it is also easier to scale than traditional blockchains. In addition, the resource access blockchain 325 can be searched much more efficiently than the resource access blockchain 125.

In FIG. 3, each type of block is tracked via a branch 310A-310N off the primary blockchain 300. For example, for user X 103 there are three admin blocks 302A-302N that link back to the genesis block 200. The admin block 302A (which is also in the primary blockchain 300/branch 310A) is where user X 103 was given level 1 access based on providing one authentication credential on Jan. 3, 2020. The admin block 302B (which is in the branch 310A) indicates that user X 103 was later given level 2 access based on providing two authentication credentials on Feb. 20, 2020. The admin block 302N indicates that user X 103 had all access privileges removed on Jan. 9, 2021. In one embodiment, if there are multiple users 103 that are granted access, there may be multiple branches 310 off a block in the primary blockchain 300 (one for the transactions for each administered user 103). For example, when user Y 103 was administered for access, a new administration block 302 would be added to the end of the primary blockchain 300 and additional administrations for user Y would cause a new branch 310 to be added. Alternatively, all admin blocks 302 may be in a single branch 310 regardless of how many users 103 are administered.

Likewise, tracking of the resource(s) 124 can be tracked in a branch 310B as shown in FIG. 3. The resource block 301A shows that a resource 124 (e.g., Jane Doe's record) was created on January 3 by user X 103 using a level 2 authentication. The branch 310B for the resource block 301B indicates that level 1 data was modified by user Y on Aug. 1, 2020 (e.g., Jane Doe's address). The level 2 data was then modified by user X on May 3, 2021 as shown in resource block 301N (e.g., Jane Doe's credit card number). The blocks 301B-301N may also have what the modifications were (e.g., specific fields and the exact changes).

In one embodiment, deletion of the forget me encryption keys may be tracked in the resource blocks 301. The resource blocks 301A-301N are shown where all the resource blocks 301A-301N are in a single branch 310B. However, individual branches 310 may be created based on a user 103. For example, there would be separate branches 310 for user Y and user X for resource blocks 301.

The login blocks 303A-303N are also tracked via a branch 310C. For example, user X 103 logged in using authentication level 2 on May 5, 2020 as shown in login block 303A. User X 103 then logged out on May 5, 2020 as shown in login block 303B. User X then logged in on May 6, 2020 using authentication level 1. The login blocks 303A-303N could also contain time information. If user X 103 logged into a second resource 124 (tracked by a different resource access blockchain 325), that login would be tracked in a second resource access blockchain 325. In other words, the logins/logouts may be tracked on a per resource level (or any of the blocks, e.g., blocks 301-304).

The login blocks 303A-303N may include invalid logins. The login blocks 303 for invalid logins may comprise information about how different the login password was from the actual password (e.g., using a likeliness score). The likeliness score may take into account previous passwords or known passwords used by hackers. This can be used to identify patterns for invalid login attempts.

Likewise, the access blocks 304A-304N can be tacked via branch 310N. The branch 310N may be based on a user (or not), a device, an application, and/or the like. For example, in FIG. 3, the access block 304A (in the primary blockchain 300) indicates that user X 103 accessed level 1 data. The access block 304N (in the branch 310N) indicates that user X accessed level 2 data on Mar. 14, 2021. The access blocks 304A-304N may also indicate specific records that were accessed.

Although not shown in FIG. 3, deletion of forget me keys could be accomplished via a separate branch 310. For example, the branch 310 may be for deletion of all the forget me keys regardless of the user 103. Alternatively, the branch 310 may be based at a per user level. The delete forget me key blocks may indicate which records the deleted encryption key applies to. For example, the encryption key may be specific to a record, a group of records, or all records.

Likewise, other types of blocks could be included in the resource access blockchain 325, such as an execution block, a configuration block, and/or the like. The execution blocks would have a specific branch 310 for execution of an application. There may be separate branches 310 for each application. Alternatively, the applications may all be tracked in a single branch 310. Likewise, the configuration blocks may be for an application where each application is tracked in a separate branch 310 or in a single branch 310. In one embodiment, since the configuration/execution may be tied to a specific application, the execution blocks/configuration blocks may be in the same branch 310. In this embodiment, the branch 310 is based on an application.

Figure 4:
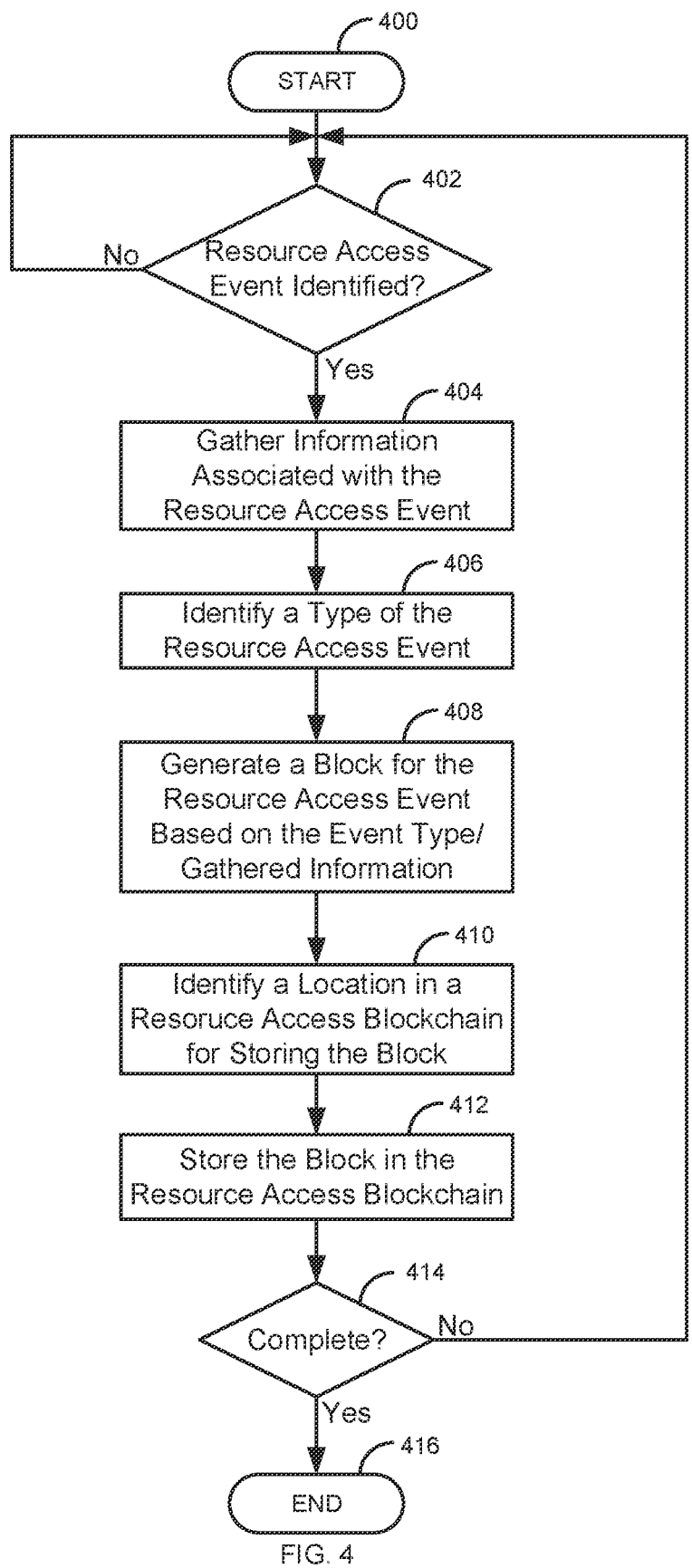
FIG. 4 is a flow diagram of a process for management of resource access in a resource access blockchain.
Figure 5:
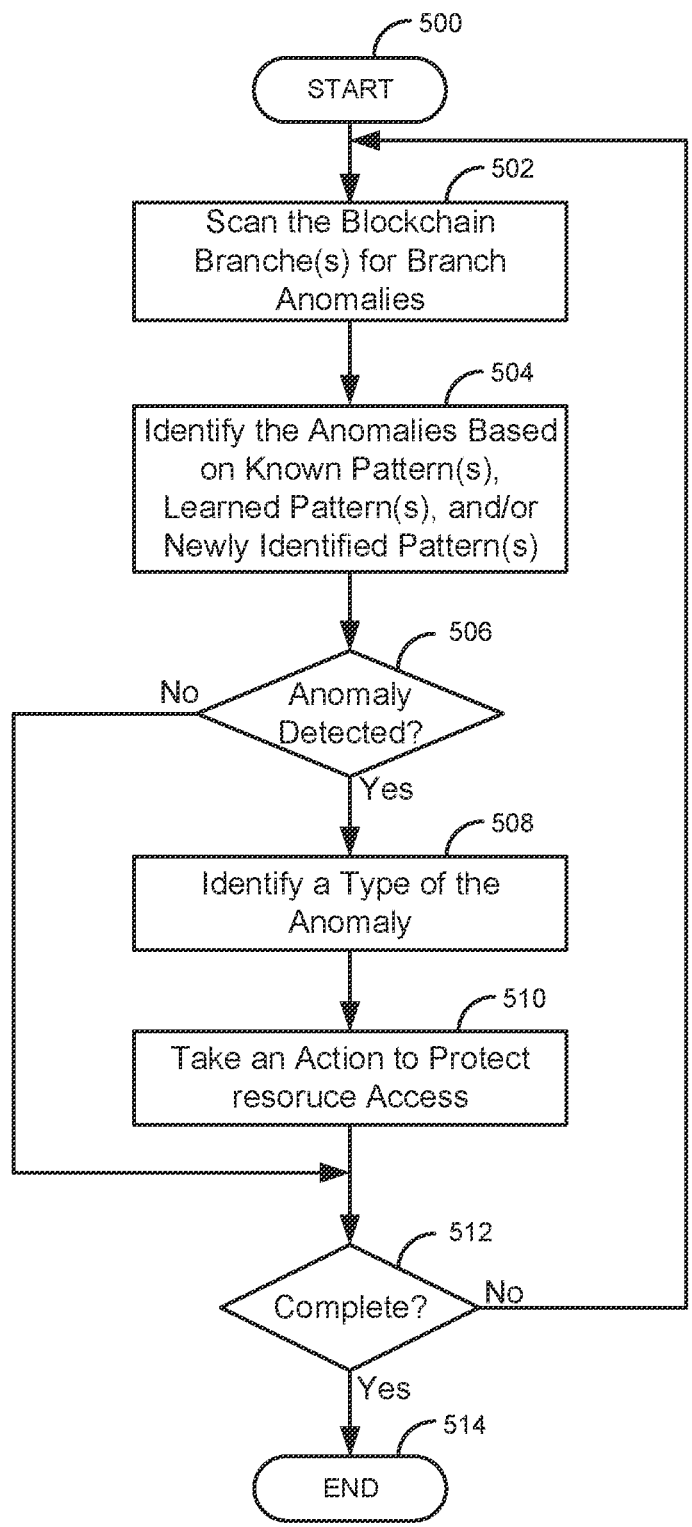
FIG. 5 is a flow diagram of a process for identifying anomalies in branches of a resource access blockchain.

FIG. 4 is a flow diagram of a process for management of resource access in a resource access blockchain 125/325. Illustratively, communication device 101, the authentication module 102, the server 120, the authentication module 122, the access module 123, the resource(s) 124, the distributed ledger 126, and the anomaly detection module 127 are stored-program-controlled entities, such as a computer or microprocessor, which performs the method of FIGS. 4-5 and the processes described herein by executing program instructions stored in a computer readable storage medium, such as a memory (i.e., a computer memory, a hard disk, and/or the like). Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400. The access module 123 determines, in step 402, if a resource access event has been identified. As discussed above a resource access event may be an administration event, a resource event, a login event, a logout event, a user access event, an execution event, a delete forget me key event, a configuration event, and/or the like. If a resource access event has not been identified in step 402, the process of step 402 repeats.

Otherwise, if a resource access event has been identified in step 402, the access module 123 gathers information associated with the resource access event in step 404. For example, the information may comprise time information, date information, user information, record information, device information, authentication level information, authentication credentials used, IP addresses (e.g., the IP address of the communication device 101), MAC address, and/or the like. The access module 123 identifies, in step 406, a type of the resource access event. The type may be an administration type, a resource type, a login type, a logout type, a user access type, an execution type, a configuration type, a delete forget me key type, and/or the like. The access module 123 generates, in step 408, a block for the resource access event in step 408 based on the event type/gathered information of steps 404/406.

The access module 123 identifies, in step 410, a location in the resource access blockchain 125/325 for storing the block. For example, if the blockchain is the resource access blockchain 125, the block will be added to the end of the resource access blockchain 125. If the blockchain is the resource access blockchain 325, the access module 123 will identify the appropriate branch 310 (if the branch 310 exists) or create a new block at the end of the primary blockchain 300. For example, if resource access event is a login event for user X 103, the resource module 123 will identify the branch 310C for user X logins and create a new block 303 at the end of branch 310C. The data access module 123 stores the block in the data access blockchain 125/325 in step 412.

If a distributed ledger 126 is used, the storage of step 412 is where the block is proposed to the nodes in the distributed ledger 126. Based on a consensus vote, if approved, the block is added to the resource access blockchains 125/325 in the distributed ledger 126.

The access module 123 determines, in step 414 if the process is complete. If the process is not complete in step 414, the process goes back to step 402. Otherwise, if the process is complete in step 414, the process ends in step 416.

FIG. 5 is a flow diagram of a process for identifying anomalies in branches 310 of a resource access blockchain 325. An advantage of the structure of FIG. 3 is that because the branches 310 are split out based on type, it is easier to detect anomalies because there are less blocks to search through. For example, if an unusual amount of access blocks 303 are created for user X 103 in the branch 310N in a period of time (or at an unusual time), this may indicated that user X's credentials may have been compromised. Since the specific types of blocks are on the same branch 310N (e.g., user X's access history), it is much easier to detect anomalies than if a traditional blockchain was used (e.g., the resource access blockchain 125).

The process starts in step 500. The anomaly detection module 127 scans the resource access blockchain 325 branches 310A-310N for anomalies in step 502. The anomaly detection module 127, in step 504, identifies the anomalies based on known pattern(s), learned patterns, and/or newly identified patterns.

An anomaly may be any type of anomaly, such as, a login time in a branch 310, an unusual series of user access blocks 304 in a branch 310, an unusual administration pattern or block, an unusual modification pattern, an unusual deletion pattern, an unusual creation pattern (e.g., similar to a virus pattern), a periodic pattern (e.g., a periodic login pattern), a missing block in a normal periodic pattern, an unusual execution pattern of applications, an unusual configuration or configuration pattern, an unusual access pattern, a pattern of invalid passwords, an anomalous change of passwords, a pattern of invalid biometrics (e.g., the patterns vary based on a threshold of identified biometric reference points), a pattern of invalid authentication tokens, an anomalous login pattern, an anomalous password usage pattern, an anomalous security question pattern, an anomalous captcha pattern, and/or the like.

The anomaly detection module 127 may use unsupervised machine learning to determine regular patterns by the users 103 and then be able to detect variances to the branches 310 for the individual user. For example, a variance in administrations (which can include login levels), changes to resource blocks 301 (at different levels), creation of resource 301 blocks, unusual login activity (at different levels/times), unusual access activity (at different levels), unusual use of credential types (e.g., using different login credentials/credential types than previously), changes in location information, deletion of forgetme keys, a request to delete forgetme keys, approvals to delete forgetme keys, unusual execution patterns, unusual configuration changes, and/or the like. The learned pattern may be a consistent change/addition/deletion to the resource access blockchain 325 that no longer happens; this may indicate a potential of a compromise, failure, or misconfiguration of an application. The pattern may be in the type/amount/value (the range of values changes) of data being added as blocks in the resource access blockchain 325.

The system could use learned blockchain anomaly patterns (supervised machine learning) that are learned for the different types of blocks to detect an anomaly. For example, the patterns could be a type of access/modification pattern that is associated with a known type of malware (e.g., ransomware) that occurs in a branch 310 or across branches 310. The patterns may be identified in structured/unstructured data. The patterns could a sequence of access to resource blocks 301 or a pattern across different types of blocks. For example, the pattern may be an administration, a login, and an access pattern in a particular sequence (across multiple branches 310). The pattern could be a login/administration pattern associated with a type of malware that logs in simultaneously across different systems. In this case, the anomaly would be detected by seeing the same pattern across multiple resource access blockchains 325/branches 310. The patterns could be used to identify anomalies in configuration data for one or more applications.

In addition, the anomaly detection can be across branches 310. For example, there may be unusual patterns by multiple users. This would show up on two or more separate branches 310 where the branches 310 are based on each user 103. Likewise, the anomaly detection can detect anomalies on branches 310 that are on separate resource access blockchains 325. For example, the detection can be on branches 310 that occur in resource access blockchains 325 for two corporations or in two locations (where a resource access blockchain 325 is created for each corporate location). In a cloud environment, the anomalies may be detected across tenants (potentially indicating a security breach of the cloud) where each tenant is tracked in a separate resource access blockchain 325.

The structure of FIG. 3 can be taken to a higher level for use with anomaly detection. For example, the primary blockchain 300 could be at a location level. In this example, the primary blockchain 300 could have a block in the primary blockchain 300 for each location. Off each location is a blockchain similar to FIG. 3 where the local information/administration/data/logins/access are tracked at a location level. This allows for detection of anomalies at the location level and also across locations within the corporation. Thus, detection of local anomalies or cross location anomalies can be accomplished.

The anomaly detection module 127, in step 506, determines if any anomalies are detected. If no anomalies are detected in step 506, the process goes to step 512. Otherwise, if one or more anomalies are detected in step 506, the anomaly detection module 127 identifies a type of anomaly in step 508. For example, the type may be a type of malware, a type of virus, an access anomaly, a login anomaly, an administration anomaly, a record modification anomaly, an execution anomaly, a configuration anomaly, a forget me key anomaly, and/or the like. The anomaly detection module 127, in step 510, takes an action to protect resource 124 access. The action can be sending a message to an administrator, disabling access (e.g., locking an account), disabling modification of records, logging the user 103 out, denying access, quarantining a virus/malware, blocking a port on a firewall, disabling an account, denying access at an access level, and/or the like.

The anomaly detection module 127, determines, in step 512, if the process is complete. If the process is not complete in step 512, the process goes back to step 502. Otherwise, if the process is complete in step 512, the process ends in step 514.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   identify a plurality of different types of resource access events;
   generate a plurality of primary blocks respectively corresponding to the plurality of different types of resource access events;
   sequentially add the plurality of primary blocks to a resource access blockchain to form a primary branch of the resource access blockchain anchored by a genesis block, such that:
   a first primary block is linked to the genesis block;
   every other primary block is linked to another primary block;
   each primary block is linked to just one block in the primary branch; the primary branch includes only one primary block for each different type of resource access event; and
   the plurality of primary blocks respectively anchor a plurality of secondary branches of the resource access blockchain that respectively correspond to the plurality of different types of resource access events; and
   for each of a plurality of additional blocks, sequentially:
   generate the additional block, where the additional block has a corresponding type of resource access events; and
   add the additional block as a last block to the secondary branch for the corresponding type of resource access event of the additional block, regardless of whether the secondary branch includes a most recently added block of the resource access blockchain,
   wherein secondary hashes ease blockchain scaling as hash validation is performed at a secondary branch level instead of at a level of a blockchain as a whole.

2. The system of claim 1, wherein the plurality of different types of resource access events comprises at least two of: a user administration event type, a resource event type, a user access event type, an execution event type, a forget me key addition event type, a forget me key deletion event type, and a configuration event type.

3. The system of claim 2, wherein the plurality of different types of resource access events comprises the user administration event type, wherein a primary block corresponding to the user administration event type comprises a username and one or more administered access levels for accessing a resource.

4. The system of claim 3, wherein the user administration event type is a global user administration event type that covers administration for resources of a second resource access blockchain.

5. The system of claim 2, wherein the plurality of different types of resource access events comprises the resource event type, wherein a primary block corresponding to the resource event type comprises a username and one more access levels for accessing a resource.

6. The system of claim 2, wherein the plurality of different types of resource access events comprises the user access event type, wherein a primary block corresponding to the user access event type comprises a username and specific resource accessed by a user associated with the username.

7. The system of claim 2, wherein the plurality of different types of resource access events comprises the forget me key deletion event type, wherein a primary block corresponding to the forget me key deletion event type comprises a username of a user who deleted a forget me encryption key.

8. The system of claim 2, wherein the plurality of different types of resource access events comprises the execution event type, wherein a primary block corresponding to the execution event type comprises an application name, and a name of a user or first application who executed a second application associated with the application name.

9. The system of claim 2, wherein the plurality of different types of resource access events comprises the configuration event type, wherein a primary block corresponding to the configuration event type comprises information related to how a software application was configured and/or reconfigured.

10. The system of claim 1, wherein the plurality of secondary branches of the resource access blockchain respectively corresponding to the different types of resource access events are such that:
    for each different type of resource access event, a first additional block of the different type is linked to a primary block in a secondary branch corresponding to the different type;
    for each different type of resource access event, every other additional block of the different type is linked to another block of the different type in the secondary branch corresponding to the different type; and
    each additional block has no more than one other additional block linked thereto.

11. The system of claim 10, wherein a machine learning algorithm is used to identify one or more anomalies in the resource access blockchain by detecting the one or more anomalies based on one or more patterns in one or more of the plurality of secondary branches.

12. The system of claim 11, wherein the machine learning algorithm identifies the one or more anomalies based on the one or more anomalies that are learned from a second resource access blockchain that comprises a second primary blockchain and a second plurality of individual branches of the second primary blockchain.

13. The system of claim 11, wherein the one or more patterns in the one or more of the plurality of secondary branches are identified based on one or more of: an unusual administration pattern, an unusual modification pattern, an unusual deletion pattern, an unusual creation pattern, a periodic pattern, a missing block in a normal periodic pattern, an unusual execution pattern of a software application, an unusual configuration pattern, an unusual access pattern, a pattern of invalid passwords, an anomalous change of passwords, a pattern of invalid biometrics, a pattern of invalid authentication tokens, an anomalous login pattern, an anomalous password usage pattern, an anomalous security question pattern, and an anomalous captcha pattern.

14. A method comprising:
    identifying, by a microprocessor, a plurality of different types of resource access events;
    generating, by the microprocessor, a plurality of primary blocks respectively corresponding to the plurality of different types of resource access events;
    sequentially adding, by the microprocessor, the plurality of primary blocks to a resource access blockchain to form a primary branch of the resource access blockchain anchored by a genesis block, such that:

a first primary block is linked to the genesis block;
every other primary block is linked to another primary block;
each primary block is linked to just one block in the primary branch; the primary branch includes only one primary block for each different type of resource access event; and
the plurality of blocks respectively anchor a plurality of secondary branches of the resource access blockchain that respectively correspond to the plurality of different types of resource access events; and for each of a plurality of additional blocks, sequentially:
generating, by the microprocessor, the additional block, where the additional block has a corresponding type of resource access events; and
adding, by the microprocessor, the additional block as a last block to the secondary branch for the corresponding type of resource access event of the additional block, regardless of whether the secondary branch includes a most recently added block of the resource access blockchain,
wherein secondary hashes ease blockchain scaling as hash validation is performed at a secondary branch level instead of at a level of a blockchain as a whole.

15. The method of claim 14, wherein the plurality of different types of resource access events comprises an execution event type, wherein a primary block corresponding to the execution event type comprises an application name, and a name of a user or first application who executed a second application associated with the application name.

16. The method of claim 14, wherein the plurality of different types of resource access events comprises a configuration event type, wherein a primary block corresponding to the configuration event type comprises information related to how a software application was configured and/or reconfigured.

17. The method of claim 14, wherein the secondary branches of the resource access blockchain respectively corresponding to the different types of resource access events are such that:
for each different type of resource access event, a first additional block of the different type is linked to a primary block in a secondary branch corresponding to the different type;
for each different type of resource access event, every other additional block of the different type is linked to another block of the different type in the secondary branch corresponding to the different type; and
each additional block has no more than one other additional block linked thereto.

18. The method of claim 17, wherein a machine learning algorithm is used to identify one or more anomalies in the resource access blockchain by detecting the one or more anomalies based on one or more patterns in one or more of the plurality of secondary branches.

19. The method of claim 18, wherein the machine learning algorithm identifies the one or more anomalies based on the one or more anomalies that are learned from a second resource access blockchain that comprises a second primary blockchain and a second plurality of individual branches of the second primary blockchain.

20. A non-transitory computer readable medium storing instructions executable by a processor to perform a method comprising:
identify a plurality of different types of resource access events;
generate a plurality of primary blocks respectively corresponding to the plurality of different types of resource access events;
sequentially add the primary plurality of blocks to a resource access blockchain to form a primary branch of the resource access blockchain anchored by a genesis block, such that:
a first primary block is linked to the genesis block;
every other primary block is linked to another primary block;
each primary block is linked to just one block in the primary branch; the primary branch includes only one primary block for each different type of resource access event; and
the plurality of primary blocks respectively anchor a plurality of secondary branches of the resource access blockchain that respectively correspond to the plurality of different types of resource access events; and for each of a plurality of additional blocks, sequentially:
generate the additional block, where the additional block has a corresponding type of resource access events; and
add the additional block as a last block to the secondary branch for the corresponding type of resource access event of the additional block, regardless of whether the secondary branch includes a most recently added block of the resource access blockchain,
wherein secondary hashes ease blockchain scaling as hash validation is performed at a secondary branch level instead of at a level of a blockchain as a whole.

* * * * *